United States Patent
Zazelenchuk et al.

(10) Patent No.: US 8,407,118 B1
(45) Date of Patent: Mar. 26, 2013

(54) METHOD AND SYSTEM FOR GENERATING AN ECONOMIC INDICATOR USING AGGREGATED FINANCIAL DATA

(75) Inventors: Todd William Zazelenchuk, Belmont, CA (US); Thomas A. Frasher, Sunnyvale, CA (US); Todd Matthew Fitch, Santa Clara, CA (US); Benjamin R. Weiss, Portola Valley, CA (US); Christopher Friedrich Dolezalek, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 925 days.

(21) Appl. No.: 12/060,065

(22) Filed: Mar. 31, 2008

(51) Int. Cl.
*G06Q 40/00* (2012.01)
(52) U.S. Cl. .......................................................... 705/35
(58) Field of Classification Search ...................... 705/35
See application file for complete search history.

(56) References Cited

U.S. PATENT DOCUMENTS

| | | | |
|---|---|---|---|
| 6,856,973 B1* | 2/2005 | Bott | 705/36 R |
| 7,181,413 B2* | 2/2007 | Hadden et al. | 705/7.42 |
| 2002/0061507 A1* | 5/2002 | Kawamura | 434/379 |
| 2002/0161595 A1* | 10/2002 | Cepeda | 705/1 |
| 2003/0061132 A1* | 3/2003 | Yu et al. | 705/30 |
| 2004/0039619 A1* | 2/2004 | Zarb | 705/7 |
| 2004/0199445 A1* | 10/2004 | Eder | 705/35 |
| 2005/0108084 A1* | 5/2005 | Ramamoorti et al. | 705/10 |
| 2009/0144070 A1* | 6/2009 | Psota et al. | 705/1 |

OTHER PUBLICATIONS

Ghalayini, A. M., & Noble, J. S. (1996). The changing basis of performance measurement. International Journal of Operations & Production Management, 16(8), 63-80. Retrieved Nov. 30, 2012.*

* cited by examiner

*Primary Examiner* — Kito R Robinson
(74) *Attorney, Agent, or Firm* — Osha Liang LLP

(57) ABSTRACT

A method for generating an economic indicator involves obtaining financial data from multiple data sources, where the data courses include multiple business applications and/or multiple personal financial management applications. The method further involves aggregating financial data to obtain aggregated financial data, and generating the economic indicator using aggregated financial data.

23 Claims, 5 Drawing Sheets

METHOD AND SYSTEM FOR GENERATING AN ECONOMIC INDICATOR USING AGGREGATED FINANCIAL DATA

BACKGROUND

Because economies (for example, regional economies, national economies, global economies, and cross-sections thereof) can be very complicated, economists tend to be interested in generating economic indicators that help quantify and/or predict behaviors of the economies.

As a first example, consumer spending trends often provide insight into the behavior of an economy. When consumers start purchasing more of one type of product, or less of another type of product, that information may be used by businesses and/or government entities to make informed business and/or economic policy decisions. Similarly, growth or decline in particular economy or economic sector may help businesses and/or government entities to make informed business and/or economic policy decisions.

As a second example, businesses are often interested in their employees' productivity levels. High productivity helps propel business growth, while low productivity can hinder business growth. However, businesses often struggle to correctly identify and implement effective investments in worker productivity.

As a third example, businesses and government entities are often interested in the balance of import and export levels between different political entities, such as cities, counties, states, or countries. A large imbalance one way or the other may provide insight into the effectiveness of business and/or economic policy decisions.

The aforementioned examples are only a subset of the various economic indicators in which businesses and government entities may be interested. Many different types of economic indicators exist that may help businesses and/or government entities make informed business and/or economic policy decisions.

SUMMARY

In general, in one aspect, the invention relates to a method for generating an economic indicator. The method comprises obtaining financial data from a plurality of data sources, wherein the plurality of data courses comprises at least one selected from a group consisting of a plurality of business applications and a plurality of personal financial management applications, aggregating financial data to obtain aggregated financial data, and generating the economic indicator using aggregated financial data.

In general, in one aspect, the invention relates to a system. The system comprises an aggregate data repository configured to store aggregated financial data, wherein aggregated financial data comprises financial data from a plurality of data sources, and wherein the plurality of data sources comprises at least one selected from a group consisting of a plurality of business applications and a plurality of personal financial management applications. The system further comprises a data processing service operatively connected to the aggregate data repository and configured to generate an economic indicator based on aggregated financial data.

In general, in one aspect, the invention relates to a computer readable medium comprising executable instructions for generating an economic indicator. Executable instructions comprise instructions to obtain financial data from a plurality of data sources, wherein the plurality of data courses comprises at least one selected from a group consisting of a plurality of business applications and a plurality of personal financial management applications, aggregate financial data to obtain aggregated financial data, and generate the economic indicator using aggregated financial data.

Other aspects of the invention will be apparent from the following description and the appended claims.

DETAILED DESCRIPTION

Figure 1:
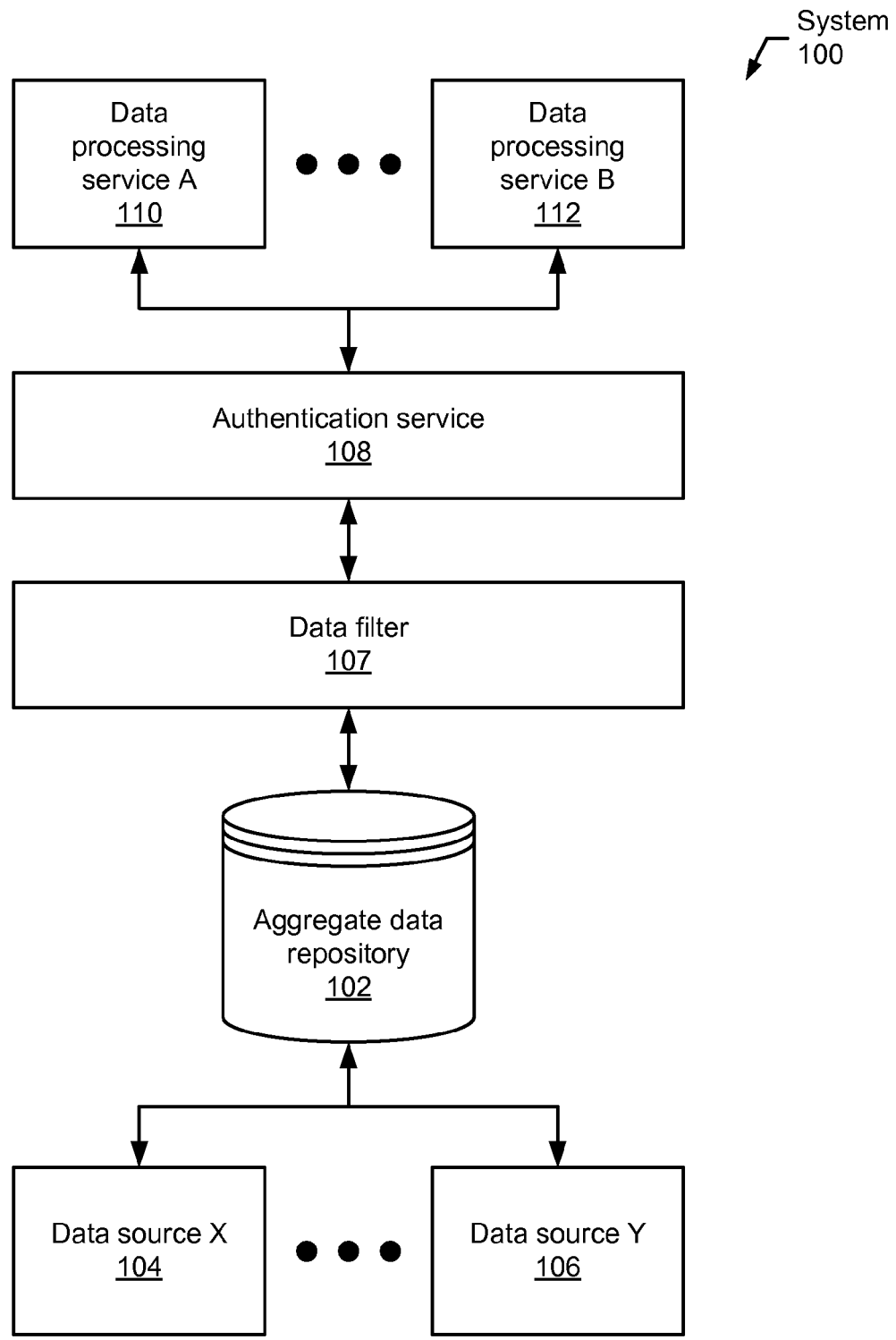
FIGS. 1-2 show diagrams of systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for generating an economic indicator using aggregated financial data. The financial data may be aggregated from multiple business applications, personal financial management applications, or a combination thereof. Specific examples of economic indicators that may be generated based on aggregated financial data are discussed in detail below.

FIG. 1 shows a diagram of a system (100) in accordance with one or more embodiments of the invention. The system (100) includes multiple data sources (e.g., data source X (104), data source Y (106)) configured to provide data to an aggregate data repository (102). The aggregate data repository (102) is referred to as "aggregate" because it is configured to store aggregated data from the data sources. For the purposes of this discussion, "aggregated" means "grouped together." For example, if the aggregate data repository (102) is a database, data from the data sources may be grouped together in one or more tables of the database. Alternatively, aggregated data may be grouped together as cells in a spreadsheet, fields of an extensible markup language (XML) document, or in any other aggregated format. Those skilled in the art will appreciate that data may be stored and aggregated in many different ways.

In one or more embodiments of the invention, the data sources include one or more business applications. Further, the data sources may not be limited to business applications. For example, the data sources may include one or more financial management applications for managing individual or family finances. Many different types of data sources may be used.

Business applications are software products that provide functionality for managing business operations. For example, the data sources may include one or more financial management applications used to manage finances (i.e., income, expenses, taxes, and/or any other type of financial data) for a business. Further, the data sources may include one or more payroll applications, customer relationship management (CRM) applications, shopping cart applications (for example, associated with the backend of a shopping website), inventory tracking applications, supply chain management applications, project management applications, production management application (for example, associated with large object manufacturing and/or large quantity manufacturing), or any other type of business application configured to provide data relating to business operations.

In one or more embodiments of the invention, data provided by the data sources include purchase records obtained from personal financial management applications. Specifically, one or more of the financial management applications may be used to track individual and/or family expenses over time, for example using electronic bank records and/or manual entries based on purchase receipts. In one or more embodiments of the invention, data from personal financial management applications include itemized credit card bills.

For example, an itemized credit card bill may indicate the locations where products were purchased and the amounts paid for the products. For the purposes of this discussion, "products" may include goods (i.e., physical items sold by brick-and-mortar and/or electronic retail outlets) and/or services (i.e., professional services offered by industry specialists, such as construction work, tax assistance, haircuts, securities management, laundry, consultancy, or any other type of professional services offered by industry specialists). The itemized credit card bill may have been entered manually into the personal financial management application, or may have been transferred into the personal financial management application from a financial institution using automated processes.

In one or more embodiments of the invention, data provided by the data sources include product shipping records obtained from business applications. Specifically, product shipping records may indicate the number of units of a product shipped by businesses to warehouses, brick-and-mortar stores, and/or any other location where products may be stored. Products represented in the product shipping records may have been shipped before being purchased, after being purchased, or a combination thereof.

In one or more embodiments of the invention, data provided by the data sources include product inventory data from business applications. Specifically, inventory data indicate the number of unsold units of products being stocked by businesses. The data may also include parts purchase records—that is, records indicating parts purchased for the development and/or manufacturing of products. Those skilled in the art will appreciate that parts purchases are often an indication of future inventory levels. Further, the data may include information about days sales outstanding (DSO) for products sold by businesses. DSO is a measure of the amount of time between sale of a product and receipt of payment for the product.

In one or more embodiments of the invention, data provided by the data sources include data about a business investment, employee productivity before the business investment, and employee productivity after the business investment. For example, employee productivity may be measured as number of hours worked, overall product output for the business (for example, the total number of units of the product produced), realized billings, or any other suitable measure of employee productivity. In one or more embodiments of the invention, investments in employee productivity include tangible business assets, such as office space, computers, office supplies, and/or other types of tangible business assets. Alternatively, investments in employee productivity may include improved health plans, year-end bonuses, special events such as parties or conferences, training, or any other type of intangible investment.

In one or more embodiments of the invention, investments in productivity are identified using investment flags. Specifically, in business applications, data associated with the investments may flagged using some type of electronic marker, such as an XML tag, a field in a database, or any other suitable type of "flag." In one or more embodiments of the invention, investment flags help identify which business practices were intended as investments in productivity, and help identify the dates when the investments occurred.

In one or more embodiments of the invention, data from the data sources include business-to-business billing data. Specifically, the data may include records of bills submitted from one business to another. For example, businesses often bill each other for purchases of physical goods and/or business services. The businesses may be located in the same country, or may be located in different countries. For businesses located in different countries, business-to-business billing data may be adjusted to accommodate currency exchange rates between the countries. Further, the data may include records of international funds transfers between different offices of a business. For example, software companies, financial consultancies, and law firms often have offices in different countries. Such multinational entities sometimes transfer funds between offices for business or accounting purposes.

In one or more embodiments of the invention, data provided by the data sources include price data. For the purposes of this discussion, price data are data that describe a product and an amount charged for the product. Further, if the price data are associated with an actual purchase of the product, the price data may include information about the purchase, such as the date of purchase, the number of units of the product purchased, the location where the product was purchased, or any other type of information relating to the purchase. As noted above, the data sources may include financial management applications. In one or more embodiments of the invention, price data are obtained from entries in the financial management applications, such as entries used to track expenses over time. Many different types of price data may be used, depending on the type(s) of data sources used. Further, the price data may indicate prices paid for the same product in different countries. For example, the price of consumer electronics may vary significantly from one country to the next.

In one or more embodiments of the invention obtained from the data sources include data about accounts receivable associated with a business. Specifically, the data may include information about monies owed to the business by a customer (i.e., an individual, a corporation, a government entity, or any other type of customer, depending on the type of business and type(s) of product sold). The data may include invoices, amounts owed, dates when payments are due, and/or any other type of data associated with accounts receivable. Further, data obtained from the data sources may include information about accounts payable associated with a business. Specifically, the data may include information about monies owed by the business to suppliers. The data may include invoices, amounts owed, dates when payments are due, and/or any other type of data associated with accounts payable.

Further, data transmitted to the aggregate data repository (102) may include demographic information about businesses, such as name, location, industry, annual revenues, or any other type of demographic information about the businesses. Demographic information about the businesses may be used to filter aggregated data as described below.

Further, data transmitted to the aggregate data repository (102) may include information about individuals and/or families, such as name, age, gender, ethnicity, occupation, annual household income, or any other type of demographic information about the individuals and/or families. Demographic information about the individuals and/or families may be used to filter aggregated data as described below.

Further, in one or more embodiments, the system (100) includes one or more data processing services (e.g., data processing service A (110), data processing service B (112)). The data processing services are configured to generate one or more economic indicators or other types of business and/or finance metrics based on data stored in the aggregate data repository (102). Specifically, in one or more embodiments of the invention, one or more of the data processing services are configured to generate an economic indicator or other type of metric using one or more methods described in detail below.

For example, a data processing service may be configured to determine a consumer spending trend based on product purchase records, determine directional growth of an economy based on inventory data, determine a productivity return on a business investment, determine import/export flow based on business-to-business billing data, determine a real exchange rate between two different countries, or determine any other type of economic indictor and/or other type of metric using aggregated data.

In view of the above, in one or more embodiments, the data sources may be thought of as input services for the aggregate date repository (102), because the data sources are used to input data to the aggregate data repository (102). Further, in one or more embodiments, the data processing services may be thought of as output services for the aggregate data repository (102), because the data processing services generate output based on the data in the aggregate data repository (102). Specifically, the data processing services generate output in the form of economic indicators and/or other types of metrics, and may also be configured to generate other types of output based on data from the aggregate data repository (102). In one or more embodiments, the aggregate data repository (102) is communicatively coupled with application programming interfaces (APIs) (not shown) that allow input services and/or output services to interact with the aggregate data repository (102).

In one or more embodiments of the invention, access to the aggregate data repository (102) is restricted using an authentication service (108). Specifically, the authentication service (108) is configured to ensure that only authorized data processing services are given access to the aggregate data repository (102). For example, the authentication service (108) may require a data processing service to present a username and/or password, an encrypted digital signature, or any other type of authorization credential recognized as valid by the authentication service (108). In one or more embodiments, the aggregate data repository (102) is located in a local area network (LAN) and the authentication service (108) includes a firewall protecting the LAN from unauthorized access.

Further, the system (100) may include a data filter (107) configured to filter data provided to the data processing services. In one or more embodiments of the invention, filtering the data allows for economic indictors and/or other types of metrics to be customized for different demographics. For example, the data may be filtered based on information about people purchasing the products, such as age, gender, location, and annual income. The data may also be filtered based on information about the businesses selling the products, such as location or industry. Many different types of filtering criteria may be used. In one or more embodiments of the invention, individual data processing services are authorized to access only a subset of the data in the aggregate data repository (102), and the data filter (107) is configured to enforce the subsets available to the data processing services. In one or more embodiments of the invention, if a data processing service has access to only a subset of the data, any data outside that subset are completely hidden from the data processing service.

Figure 2:
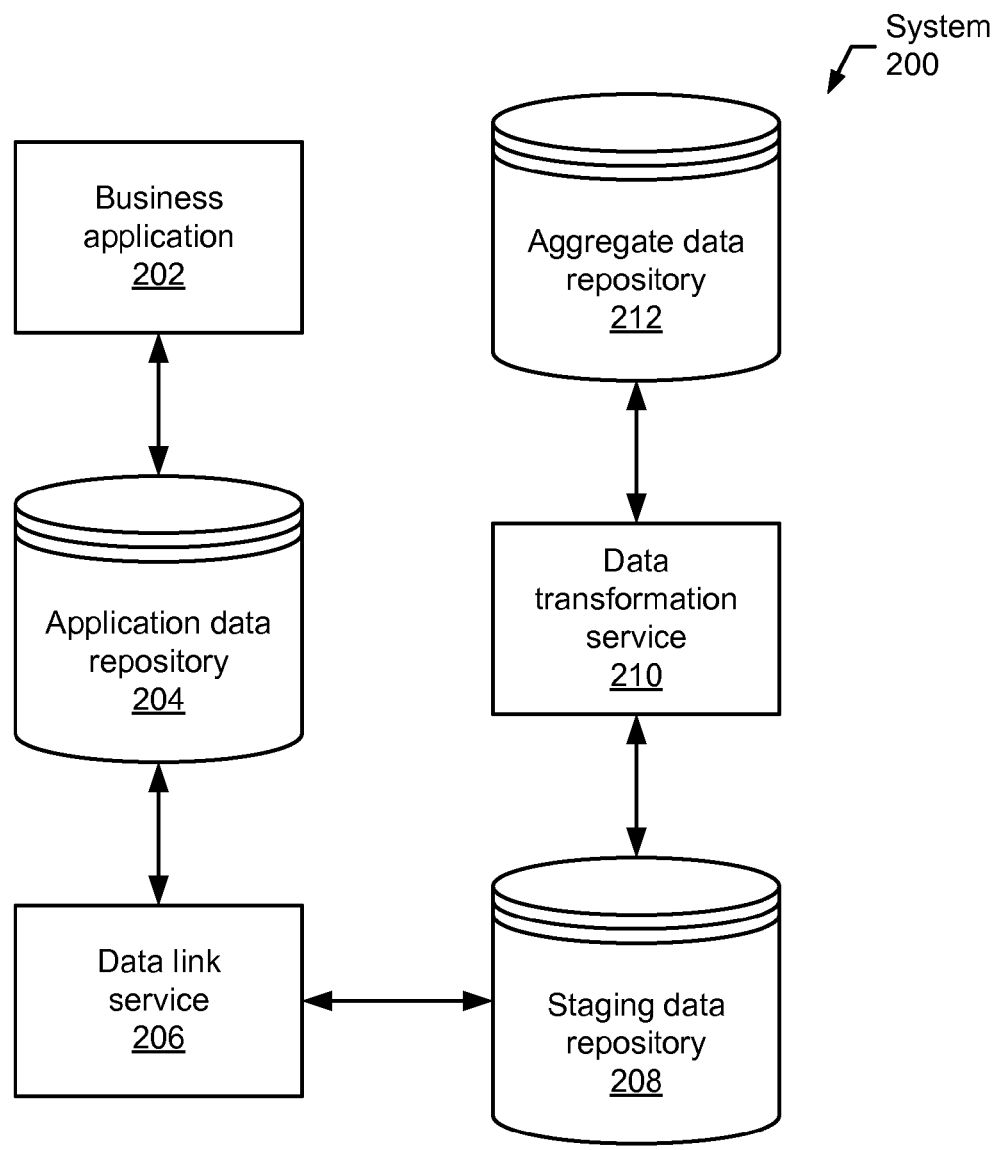

As discussed above, the data sources diagrammed in FIG. 1 may include one or more business applications. FIG. 2 shows a diagram of a system (200) that includes a business application (202) in accordance with one or more embodiments of the invention. The business application (202) may be a financial management application, a payroll application, a CRM application, a shopping cart application, an inventory tracking application, a supply chain management application, or any other type of business application configured to provide data relating to business operations.

In one or more embodiment of the invention, data from the business application (202) are stored in an application data repository (204). The application data repository (204) may be a database, an XML document, a spreadsheet, a text file, or any other type of repository configured to store data associated with the business application (202). In one or more embodiments of the invention, data stored in the application data repository (204) include one or more types of business and/or personal financial data described in detail above.

In one or more embodiments of the invention, before data from the application data repository (204) are transmitted to an aggregated data repository (212), the data are transformed to a format compatible with the aggregate data repository (212). As one example, if the aggregate data repository (212) is a database, the data may require normalization to conform with a database schema used by the aggregate data repository (212). As another example, the data may require transformation to a particular XML format. Many different types of data transformation may be required, depending on the implementations of the application data repository (204) and the aggregate data repository (212).

In one or more embodiments of the invention, to transform the data to a compatible format, the data are transmitted to a staging data repository (208) using a data link service (206). In one or more embodiments, the data link service (206) is a module or plug-in of the business application (202). Alternatively, the data link service (206) may be independent of the business application (202). In either case, the data link service (206) is configured to retrieve data from the application data repository (204) and transmit the data (for example, over a file system and/or network) to the staging data repository (208).

Further, in one or more embodiments, the data link service (206) is configured to retrieve only a subset of the data available in the application data repository (204). For example, if the application data repository (204) is configured to store an individual's financial data, the data link service (206) may omit data that uniquely identify the individual, such as a credit card number, a social security number, a street address, a phone number, or any other type of personally identifying data. Alternatively, personally identifying data may be transmitted to the aggregate data repository (212), and privacy of the data may be enforced by another component of the system (200), such as an authentication service (not shown) communicatively coupled with the aggregate data repository (212).

In one or more embodiments of the invention, once the data are stored in the staging data repository (208), the data are transformed to the required format by a data transformation service (210) and the transformed data are transmitted to the aggregate data repository (212). Data stored in the aggregate data repository (212) may then be used to generate an economic indicator, as discussed herein.

While the system (200) shown in FIG. 2 includes several different components, embodiments of the invention may be envisioned that omit one or more of these components. For example, in one or more embodiments, the data link service (206) is configured to transmit data directly to the data transformation service (210). In such cases, use of the staging data repository (208) may not be required. Further, the business application (202) may be configured to generate data in a format that is already compatible with the aggregate data repository (212). In such cases, use of the data transformation service (210) may not be required.

Moreover, the business application (202) may be configured to store data directly in the aggregate data repository (212). For example, the business application (202) may be a web-based application configured to use the aggregate data repository (212) for data storage. In such cases, the application data repository (204) and data link service (206) may not be required. Alternatively, the system (200) may be logically separated into client-side and server-side components. For example, the business application (202), application data repository (204), and/or data link service (206) may be executing on an end-user's computer system, and the staging data repository (208), data transformation service (210), and/or aggregate data repository (212) may be executing on one or more other computer systems separated from the end-user's computer system by a network.

Many different embodiments of the system (200) may be envisioned that remain within the scope of the invention. Further, while the system (200) is described with respect to a business application (202), a similar system may be envisioned that uses a financial management application for individual and/or family finances.

Figure 3:
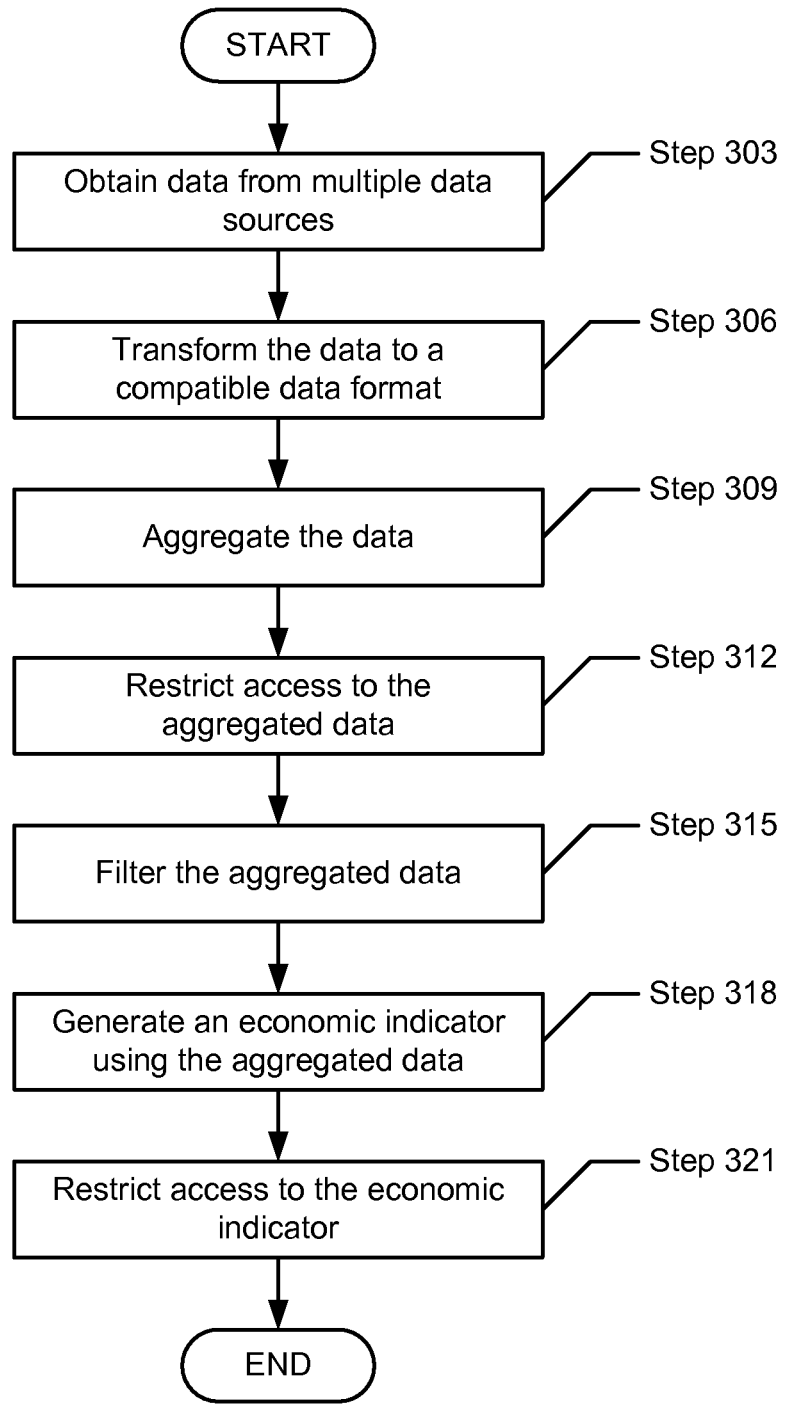
FIG. 3 shows a flowchart of a method for aggregating data in accordance with one or more embodiments of the invention.

FIG. 3 shows a flowchart of a method for aggregating data in accordance with one or more embodiments of the invention. In one or more embodiments of the invention, one or more of the steps shown in FIG. 3 may be omitted, repeated, and/or performed in a different order than the order shown in FIG. 3. Accordingly, embodiments of the invention should not be considered limited to the specific arrangement of steps shown in FIG. 3.

In one or more embodiments of the invention, in Step 303, data are obtained from multiple data sources. As discussed above, the data sources may include one or more business applications and/or financial management applications for managing individual or family finances. For example, the data sources may include one or more financial management applications used to manage finances for a business. Further, the data sources may include one or more payroll applications, CRM applications, shopping cart applications, inventory tracking applications, supply chain management applications, project management applications, production management application, or any other type of business application configured to provide data relating to business operations In one or more embodiments of the invention, the data obtained from the data sources include price data associated with products (i.e., goods and/or services), and may also include demographic information about businesses, individuals, and/or families.

In one or more embodiments of the invention, in Step 306, the data are transformed to a data format that is compatible with an aggregate data repository. For example, as discussed above, the data may be transformed to satisfy a particular database schema or XML format. Further, as discussed above, the data may be transformed using a data transformation service communicatively coupled with the aggregate data repository. In general, in one or more embodiments of the invention, transforming the data allows for data from multiple types of data sources to be aggregated in the aggregate data repository.

In one or more embodiments of the invention, in Step 309, the data are aggregated. As noted above, "aggregating" means "grouping together." For example, data may be grouped in one or more tables of the database, cells in a spreadsheet, fields of an extensible XML document, or in any other aggregated format. In one or more embodiments of the invention, aggregating the data helps facilitate generating an economic indicator based on data from multiple data sources.

In one or more embodiments of the invention, in Step 312, access to the aggregated data is restricted. Restricting access to the aggregated data involves ensuring that only authorized entities (for example, businesses, individuals, and/or government entities) have access to the aggregated data. For example, access may be restricted by enforcing a username and/or password, an encrypted digital signature, or any other type of authorization credential. Further, access may be restricted based on a location of the aggregate data repository in a network. For example, the aggregate data repository may be located in a local area network (LAN) and access may be restricted using a firewall that protects the LAN from unauthorized access.

Further, in one or more embodiments of the invention, access to the aggregated data is restricted based on whether an entity has purchased access to the aggregated data. In other words, access to the aggregated data may be sold and non-paying entities may be restricted from accessing the aggregated data. For example, an entity may purchase access to query (using Structured Query Language (SQL), a report interface, or any other appropriate query mechanism) the aggregated data or a subset thereof. In one or more embodiments of the invention, access to the aggregated data is sold using a subscription model, where the entity purchases access for a limited time period or with recurring fees.

Alternatively, a copy of the aggregated data (or a subset thereof) may be provided to the entity in an electronic storage medium. As one example, aggregated data may be packaged in an electronic file and transmitted to the entity via File Transfer Protocol (FTP), email or any other type of electronic transmission. As another example, a data set including the aggregated data (or a subset thereof) may be written to a portable storage medium such as a compact disc (CD), digital video disc (DVD), flash drive, or any other type of portable storage medium given to the purchasing entity. Many different purchase and delivery models may be used to provide restricted access to the aggregated data. In one or more embodiments of the invention, the price of access is proportional to the amount of access granted. For example, access to query all of the aggregated data may cost more than access to query a subset of the aggregated data (for example, for a particular demographic population).

In one or more embodiments of the invention, in Step 315, the aggregated data are filtered. As discussed above, filtering the data may allow for economic indicators to be customized for different demographics. For example, the data may be filtered based on information about individuals and/or families, such as age, gender, location, and annual income. The data may also be filtered based on information about businesses, such as location or industry. Many different types of filtering criteria may be used. Further, the aggregated data may effectively be filtered retrospectively. In other words, because the aggregate data repository may include a variety of demographic data, different filtering criteria may be applied at different times. As noted above, traditional methods of generating economic indicators rely on samples and surveys that are significantly limited in scope and cannot be adjusted retrospectively. In one or more embodiments of the invention, restricting access to the aggregated data (Step 312) also involves a type of filtering, by limiting access to a particular subset of the aggregated data.

In one or more embodiments of the invention, in Step 318, an economic indicator is generated using the aggregated data. Many different types of economic indicators exist. In one or more embodiments of the invention, generating the economic indicator may involve one or more steps shown in FIG. 4, discussed in detail below. In one or more embodiments of the invention, if an entity has purchased access to the aggregated data (or an entity thereof), the economic indicator is generated by the purchasing entity using the aggregated data. Alternatively, the economic indicator may be generated by the same entity that controls the aggregate data repository.

In one or more embodiments of the invention, in Step 321, access to the economic indicator is restricted. In one or more embodiments of the invention, restricting access to the economic indicator involves using a username and/or password, an encrypted digital signature, network-based security, two or more factor authentication, or any other type of access control. Further, in one or more embodiments of the invention, access to the economic indicator is based on whether an entity has paid for access to the economic indicator. In other words, access to the economic indicator may be sold and non-paying entities may be restricted from accessing the economic indicator. For example, an entity may purchase access to a one-time or periodical report (for example, a newsletter) that includes the economic indicator.

The report may be distributed by email, paper copy, portable storage medium, FTP, restricted webpage, or any other physical or electronic distribution medium. In one or more embodiments of the invention, the entity is granted access to an electronic interface that allows the entity (or a representative thereof) to run the report on demand. Alternatively, reports may be generated by the same entity that controls the aggregate data repository. The report interface may also include controls to filter the aggregated data used to generate the economic indicator (Step 315). In one or more embodiments of the invention, the specific filtering criteria used are based on requests by purchasing entities. Thus, the reports may effectively be customized for the purchasing entities. Many different purchase and delivery models may be used to provide restricted access to the economic indicator. In one or more embodiments of the invention, the price of access is proportional to the amount of access granted. For example, access to economic indicators for an entire country may cost more than access to an economic indicator for an individual town or county.

Figure 4:
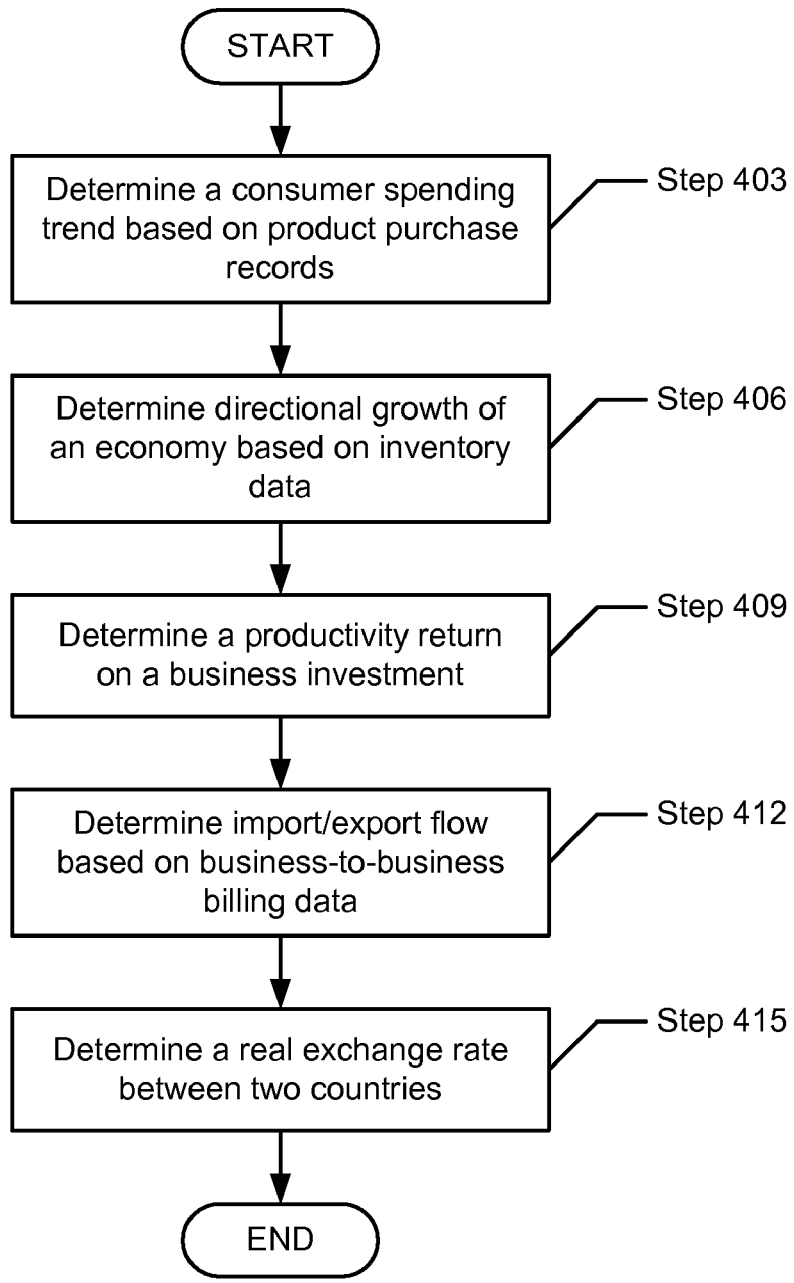
FIG. 4 shows a flowchart of a method for generating an economic indicator based on aggregated financial data in accordance with one or more embodiments of the invention.

FIG. 4 shows a flowchart of a method for generating an economic indicator based on aggregated financial data in accordance with one or more embodiments of the invention. In one or more embodiments of the invention, one or more of the steps shown in FIG. 4 may be omitted, repeated, and/or performed in a different order than the order shown in FIG. 4. Accordingly, embodiments of the invention should not be considered limited to the specific arrangement of steps shown in FIG. 4.

In one or more embodiments of the invention, in Step 403, a consumer spending trend is determined based on product purchase records. For the purposes of this discussion, "consumer spending" refers to consumer purchases of specific products or types of products, and a "consumer spending trend" is a pattern that may be determined based on aggregate information about consumer spending.

As discussed above, product purchase records are records that provide information about products purchased by consumers. Thus, product purchase records may be used to determine the sales rates of specific products or types of products. Further, sales rates may be tracked over time to identify a change in product sales over time. Moreover, because the product purchase records may be filtered based on demographic criteria, the consumer spending trend may be specific to one or more demographic criteria. For example, the consumer spending trend may indicate a change in consumer spending for a particular geographic location, income bracket, or any other demographic criterion. Further, in one or more embodiments of the invention, consumer spending trends are also based on product shipping records, which may be used to compare numbers of shipped products with numbers of products actually purchased.

The following are a few examples of common economic questions that may be answered using consumer spending trends. Have total expenditures increased because products cost more, or are people buying more products? Are people buying different types of items (i.e., in terms of spending distribution) now than at a previous time? Are people buying more or fewer durable goods? How many shipped products are actually being sold? In what areas does a particular item sell well? What types of consumers are most likely to purchase the product? Many different types of economic questions, such as the questions listed above, may be answered using consumer spending trends.

Further, product manufacturing may be adjusted based on a consumer spending trend. For example, product manufacturing may be increased in areas where consumer spending trends indicate increasing interest in a product, or decreased in areas where consumer spending trends indicate decreasing interest. Further, advertising efforts may be adjusted to target the areas and/or types of consumers most likely to purchase the product.

Continuing with discussion of FIG. 4, in one or more embodiments of the invention, in Step 406, the directional growth of an economy is determined based on inventory data. As discussed above, inventory data indicate the numbers of products stored by businesses that are not yet sold to consumers. Stockpiling inventory beyond historical numbers may indicate that a business is optimistic about its future sales, and rapid sell-offs may indicate a booming economy. Conversely, decreasing inventory below historical numbers may indicate that a business is unoptimistic about its future sales, and buildup of existing inventory may indicate a stagnant economy. Collectively, inventory data from multiple businesses may provide a reliable big-picture view of how businesses expect the economy to behave in the near or long-term future. Further, the data sources may include business applications used by small businesses, thereby including a segment of the business population usually excluded when businesses are surveyed about their expectations.

In one or more embodiments of the invention, directional growth of the economy may also be based on parts purchase records. Stockpiling of parts may indicate that the business expects to produce large numbers of products in the near future. Conversely, decreased parts purchases may indicate that the business expects a slowdown in product demand.

In one or more embodiments of the invention, directional growth of the economy is also based on DSO records. As discussed above, DSO is a measure of the time from when a product is purchased to when the buyer pays for the product.

Some buyers have relatively predictable DSO, for example always paying early, always paying late, always paying at a particular time in the financial quarter, etc. Thus, changes in payment behavior for buyers with predictable DSO may indicate a change in economic outlook. For example, an increase in DSO may indicate that buyers are floating funds and/or anticipate a slowdown in the economy. Conversely, a decrease in DSO may indicate that buyers have extra funds and/or are optimistic about the economy.

Continuing with discussion of FIG. 4, in one or more embodiments of the invention, in Step 409, a productivity return on a business investment is determined. The productivity return may be determined for an individual business, or may be based on the collective (i.e., aggregated) productivity results of similar productivity investments for multiple businesses. In one or more embodiments of the invention, the productivity return is determined by comparing employee productivity before the productivity investment with employee productivity after the productivity investment. As noted above, employee productivity may be measured as number of hours worked, overall product output for the business (for example, the total number of units of the product produced), realized billings, or any other suitable measure of employee productivity. An increase in employee productivity may indicate that the productivity investment was successful, especially if other factors that may have affected productivity are controlled.

In one or more embodiments of the invention, in Step 412, an import/export flow is determined based on business-to-business billing data. Specifically, business-to-business billing data indicates products that are being sold from one business to another. Thus, aggregated business-to-business billing data may be used to determine the overall import/export balance between locations where different businesses are located. For example, business-to-business billing data from businesses in different countries may be used to determine import/export flow between those countries. Further, the import/export flow may also be based on records of international funds transfers between offices of the same business, which are not typically included in business-to-business billing data.

In one or more embodiments of the invention, in Step 415, a real exchange rate between two countries is determined. The real exchange rate is the price difference of the same product between two different countries, and may differ significantly from the currency exchange rate. Further, the actual selling price of a product may differ significantly from the manufacturer's suggested retail price. In one or more embodiments of the invention, aggregated price data from the two countries allow for a comparison of the average price of a product in one country versus another country, thereby providing a reliable measure of the real exchange rate. Those skilled in the art will appreciate that prices may still require adjustment based on the currency exchange rate before a comparison can be done.

The aforementioned steps of FIG. 4 provide multiple examples of economic indicators that may be generated using aggregated financial data. Other types of economic indicators may also be generated using aggregated financial data, and variations of the aforementioned economic indicators may be imagined that remain within the scope of the invention. Accordingly, embodiments of the invention should not be considered limited to the specific economic indicators described relative to FIG. 4.

In general, embodiments of the invention allow for an economic indicator to be generated based on aggregated financial data. Because the financial data are obtained from multiple data sources (i.e., business applications and/or personal financial management applications) using automated processes, the financial data may be very timely and accurate. Thus, economic indicators generated using the financial data may offer a high degree of reliability. Further, because data gathered from the data sources may include a variety of demographic data, the economic indicator may be generated and regenerated using different filtering criteria. Thus, embodiments of the invention allow for economic indicators to be tailored to the specific economic interests of individuals, businesses, and/or government entities. Moreover, because parts of the aggregated data may be obtained over a period of time, the filtering criteria may be modified and used to generate economic indicators for different points in time, for aggregated data that are relevant to each point in time. For example, the economic indicator may be generated for different months to identify a month-to-month trend in the economic indicator.

Figure 5:
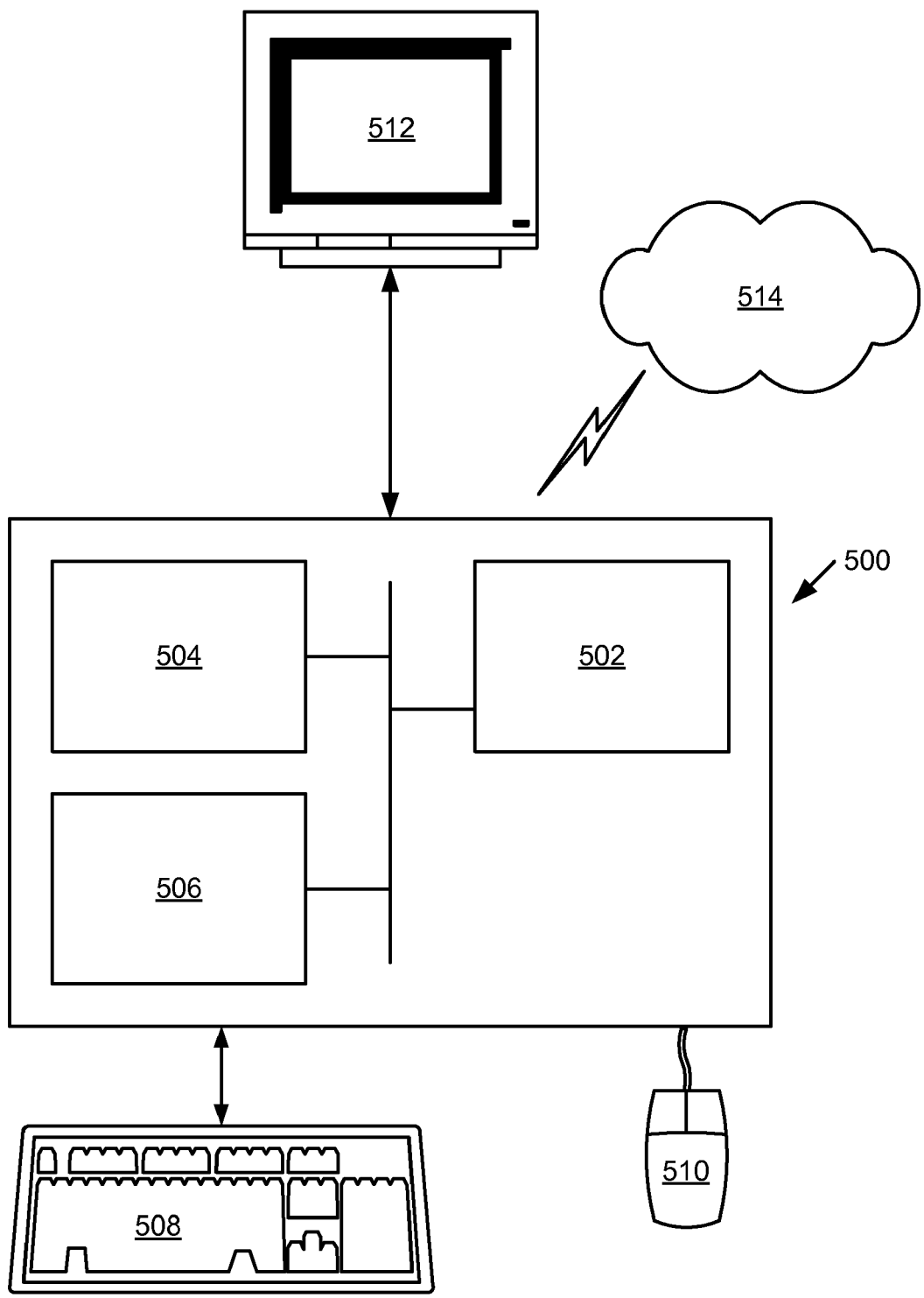
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (for example, a data processing service, authentication service, data filter, aggregate data repository, data source, business application, application data repository, data link service, staging data repository, data processing service, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating an economic indicator comprising:
   obtaining first financial data, by a processor, from a first data source, wherein the first data source comprises a first business application executing on a first system, and wherein the first financial data comprises data about a business investment, a first employee productivity measurement before the business investment, and a first employee productivity measurement after the business investment;
   storing the first financial data on a computer readable storage device;
   obtaining second financial data, by the processor, from a second data source, wherein the second data source comprises a second business application executing on a second system, and wherein the second financial data comprises data about the business investment, a second employee productivity measurement before the business investment, and a second employee productivity measurement after the business investment;
   storing the second financial data on the computer readable storage device;
   aggregating, by the processor, the first financial data and the second financial data to obtain aggregated financial data, wherein aggregating the first financial data and the second financial data comprises:
      aggregating the first employee productivity measurement before the business investment and the second employee productivity measurement before the business investment to obtain an aggregated employee productivity measurement before the business investment, and
      aggregating the first employee productivity measurement after the business investment and the second employee productivity measurement after the business investment to obtain an aggregated employee productivity measurement after the business investment;
   receiving, from a third business application executing on a third system, a request for an economic indicator regarding potential employee productivity and the business investment;
   generating, by the processor, the economic indicator using aggregated financial data by comparing the aggregated employee productivity measurement before the business investment and the aggregated employee productivity measurement after the business investment to determine a productivity return on the business investment, wherein the business investment comprises an investment in tangible business assets; and
   making the economic indicator accessible to the third business application.

2. The method of claim 1, wherein:
   the first financial data further comprises product inventory data from the first business application, and
   generating the economic indicator further comprises determining a directional growth of an economy based on product inventory data.

3. The method of claim 2, wherein the first financial data further comprises parts purchase records, wherein the directional growth of the economy is further based on parts purchase records.

4. The method of claim 2, wherein the first financial data further comprises days sales outstanding (DSO), wherein the directional growth of the economy is further based on DSO.

5. The method of claim 1, further comprising:
   identifying the business investment based on an investment flag associated with the first financial data, wherein the investment flag was generated by the first business application.

6. The method of claim 1, wherein the first employee productivity measurement before the business investment comprises overall product output for a business.

7. The method of claim 1, wherein:
   the first financial data further comprises business-to-business billing data, and
   generating the economic indicator comprises determining an import/export flow based on business-to-business billing data.

8. The method of claim 7, wherein business-to-business billing data are associated with businesses in different countries, and wherein the import/export flow comprises adjustments based on a currency exchange rate.

9. The method of claim 7, wherein the first financial data further comprises records of international funds transfers between offices of a business, and wherein the import/export flow rate is further based on international funds transfers.

10. The method of claim 1, wherein:
    the first financial data further comprises a first purchase price of a product in a first country,
    the first financial data further comprises a second purchase price of the product in a second country, and
    generating the economic indicator comprises:
       adjusting the second purchase price based on a nominal exchange rate between the first country and the second country to obtain an adjusted second purchase price, and
       determining a real exchange rate between the first country and the second country based on the first purchase price and the adjusted second purchase price.

11. The method of claim 1, further comprising:
    filtering aggregated financial data based on a demographic criterion selected from a group consisting of age, gender, location, occupation, and annual income,
    wherein the economic indicator is specific to the demographic criterion.

12. The method of claim 1, wherein making the economic indicator accessible comprises:
    selling access to a report comprising the economic indicator.

13. The method of claim 12, wherein the report is customized for an entity purchasing access to the report.

14. A system comprising:
    an aggregate data repository residing on a computer readable storage medium and configured to store aggregated financial data,
       wherein the aggregated financial data comprises first financial data from a first data source and second financial data from a second data source,
       wherein the first data source comprises a first business application executing on a first system, and wherein the first financial data comprises data about a business investment, a first employee productivity measurement before the business investment, and a first employee productivity measurement after the business investment,
       wherein the second data source comprises a second business application executing on a second system, and wherein the second financial data comprises data about the business investment, a second employee productivity measurement before the business investment, and a second employee productivity measurement after the business investment, and wherein the aggregated financial data further comprises:
an aggregated employee productivity measurement before the business investment obtained by aggregating the first employee productivity measurement before the business investment and the second employee productivity measurement before the business investment, and an aggregated employee productivity measurement after the business investment obtained by aggregating the first employee productivity measurement after the business investment and the second employee productivity measurement after the business investment;

a data processing service operatively connected to the aggregate data repository and configured to:
receive, from a third business application executing on a third system, a request for an economic indicator regarding potential employee productivity and the business investment,
generate the economic indicator by comparing the aggregated employee productivity measurement before the business investment and the aggregated employee productivity measurement after the business investment to determine a productivity return on the business investment, wherein the business investment comprises an investment in tangible business assets, and
make accessible the economic indicator to the third business application.

15. The system of claim 14, further comprising:
a data filter configured to filter aggregated financial data based on a demographic criterion selected from a group consisting of age, gender, location, occupation, and annual income,
wherein the economic indicator is specific to the demographic criterion.

16. The system of claim 10, further comprising:
an authentication service configured to restrict access to aggregated financial data.

17. The system of claim 14, wherein the first financial data further comprises product inventory data from the first business application, and wherein the data processing service is further configured to generate the economic indicator by determining a directional growth of an economy based on product inventory data.

18. The system of claim 17, wherein the first financial data further comprises parts purchase records, and wherein the directional growth of the economy is further based on parts purchase records.

19. The system of claim 17, wherein the first financial data further comprises days sales outstanding (DSO), and wherein the directional growth of the economy is further based on DSO.

20. A non-transitory computer readable medium comprising executable instructions for generating an economic indicator, wherein executable instructions comprise instructions to: obtain first financial data, by a processor, from a first data source, wherein the first data source comprises a first business application executing on a first system, and wherein the first financial data comprises data about a business investment, a first employee productivity measurement before the business investment, and a first employee productivity measurement after the business investment;
store the first financial data on a computer readable storage device; obtain second financial data, by the processor, from a second data source, wherein the
second data source comprises a second business application executing on a second system, and wherein the second financial data comprises data about the business investment, a second employee productivity measurement before the business investment, and a second employee productivity after the business investment;
store the second financial data on the computer readable storage device;
aggregate, by the processor, the first financial data and the second financial data to obtain aggregated financial data, wherein the aggregated financial data comprises:
an aggregated employee productivity measurement before the business investment obtained by aggregating the first employee productivity measurement before the investment and the second employee productivity measurement before the investment, and
an aggregated employee productivity measurement after the business investment obtained by aggregating the first employee productivity measurement after the investment and the second employee productivity measurement after the investment;
receive, from a third business application executing on a third system, a request for an economic indicator regarding potential employee productivity and the business investment;
generate, by the processor, the economic indicator using aggregated financial data by comparing the aggregated employee productivity measurement before the business investment and the aggregated employee productivity measurement after the business investment to determine a productivity return on the business investment, wherein the business investment comprises an investment in tangible business assets; and
make accessible the economic indicator to the third business application.

21. The non-transitory computer readable medium of claim 20, wherein the first financial data further comprises product inventory data from the plurality of business applications, and wherein executable instructions further comprise instructions to generate the economic indicator by determining a directional growth of an economy based on product inventory data.

22. The non-transitory computer readable medium of claim 21, wherein the financial data further comprises parts purchase records, and wherein the directional growth of the economy is further based on parts purchase records.

23. The non-transitory computer readable medium of claim 21, wherein the financial data further comprises days sales outstanding (DSO), and wherein the directional growth of the economy is further based on DSO.

* * * * *